(12) United States Patent
Zaima

(10) Patent No.: US 9,516,196 B2
(45) Date of Patent: Dec. 6, 2016

(54) IMAGE FORMING APPARATUS THAT PERFORMS CALIBRATION FOR MAINTAINING IMAGE QUALITY

(71) Applicant: CANON KABUSHIKI KAISHA, Tokyo (JP)

(72) Inventor: Nobuhiko Zaima, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/492,199

(22) Filed: Sep. 22, 2014

(65) Prior Publication Data

US 2015/0098095 A1    Apr. 9, 2015

(30) Foreign Application Priority Data

Oct. 7, 2013    (JP) .................................. 2013-210590

(51) Int. Cl.
*G06F 15/00*    (2006.01)
*H04N 1/60*    (2006.01)

(52) U.S. Cl.
CPC .......... *H04N 1/6005* (2013.01); *H04N 1/6033* (2013.01); *H04N 1/6097* (2013.01)

(58) Field of Classification Search
CPC ... H04N 1/6005; H04N 1/6033; H04N 1/6097
USPC ........................................................ 358/1.2
See application file for complete search history.

(56) References Cited

U.S. PATENT DOCUMENTS

| | | | |
|---|---|---|---|
| 5,583,644 A | * | 12/1996 | Sasanuma .......... G03G 15/5062 358/296 |
| 6,456,803 B2 | | 9/2002 | Suzuki et al. |
| 7,097,270 B2 | | 8/2006 | Yamazaki |
| 7,385,737 B2 | | 6/2008 | Zaima |

(Continued)

FOREIGN PATENT DOCUMENTS

| | | |
|---|---|---|
| CN | 101097420 A | 1/2008 |
| CN | 102375359 A | 3/2012 |

(Continued)

OTHER PUBLICATIONS

Chinese Official Action dated Sep. 28, 2016, issued in corresponding Chinese Patent Application No. 201410515278.2, with an English translation.

*Primary Examiner* — Mark Milia
(74) *Attorney, Agent, or Firm* — Fitzpatrick, Cella, Harper & Scinto

(57) ABSTRACT

An image forming apparatus corrects image data using a correction condition. An image forming unit forms an image on a recording medium, based on the corrected image data. Read data is obtained by a reading unit reading a measurement image formed on the recording medium. A determination unit determines a process condition used when the image forming unit forms the image based on the image data, based on the read data. A conversion unit converts the read data to density data, using a conversion condition corresponding to the recording medium. A first generation unit generates the correction condition, based on the density data. A storage unit stores a first conversion condition corresponding to a specific recording medium. A second generation unit controls the image forming unit to form a first image pattern on the specific recording medium and forms a second image pattern on another recording medium.

8 Claims, 11 Drawing Sheets

(56) References Cited

U.S. PATENT DOCUMENTS

| | | |
|---|---|---|
| 7,616,908 B2 | 11/2009 | Watanabe et al. |
| 8,130,409 B2 | 3/2012 | Itagaki et al. |
| 8,705,137 B2 | 4/2014 | Zaima |
| 8,804,217 B2 | 8/2014 | Zaima |
| 2003/0085941 A1 | 5/2003 | Tezuka et al. |
| 2010/0315685 A1 | 12/2010 | Zaima |
| 2012/0019845 A1 | 1/2012 | Zaima |
| 2012/0020680 A1 | 1/2012 | Zaima |
| 2012/0033276 A1* | 2/2012 | Zaima .................. H04N 1/6033 358/518 |
| 2012/0045234 A1 | 2/2012 | Suzuki et al. |
| 2012/0128380 A1* | 5/2012 | Hirabayashi ....... G03G 15/5041 399/49 |
| 2014/0185071 A1 | 7/2014 | Zaima |

FOREIGN PATENT DOCUMENTS

| | | |
|---|---|---|
| JP | 2012-286620 A | 12/2010 |
| JP | 2012-042509 A | 3/2012 |
| JP | 2012-042674 A | 3/2012 |

* cited by examiner

IMAGE FORMING APPARATUS THAT PERFORMS CALIBRATION FOR MAINTAINING IMAGE QUALITY

CLAIM OF PRIORITY

This application claims the benefit of Japanese Patent Application No. 2013-210590, filed Oct. 7, 2013, which is hereby incorporated by reference herein in its entirety.

BACKGROUND OF THE INVENTION

Field of the Invention

The present invention relates to an image forming apparatus, and a calibration technique for maintaining the quality of an image formed by the image forming apparatus.

Description of the Related Art

The image quality of an image forming apparatus varies depending on the environment in which the image forming apparatus is used, or the status of use of the image forming apparatus. This requires calibration to update image forming conditions (such as a correction condition and a process condition) depending on the environment or the status of use. Dedicated paper for calibration, which is designated by the manufacturing company of the image forming apparatus, needs to be used in calibration. If the dedicated paper for calibration has run out, it is impossible to obtain an accurate calibration result. U.S. Patent Application Publication No. 2010/0315685 describes an image forming apparatus that can, even when any recording medium different from dedicated paper for calibration is used, obtain the same calibration result as when the dedicated paper is used.

An accumulation of various errors in calibration has been found to likely cause a decrease in density reproducibility in a high density region. In view of this, the present invention improves the calibration accuracy in the high density region.

SUMMARY OF THE INVENTION

The present invention provides an image forming apparatus comprising the following elements. A correction unit is configured to correct image data using a correction condition. An image forming unit is configured to form an image on a recording medium, based on the image data corrected by the correction unit. An obtaining unit is configured to obtain read data obtained by a reading unit reading a measurement image formed on the recording medium by the image forming unit. A determination unit is configured to determine a process condition used in a case when the image forming unit forms the image based on the image data, based on the read data obtained by the obtaining unit. A conversion unit is configured to convert the read data to density data, using a conversion condition corresponding to the recording medium. A first generation unit is configured to generate the correction condition, based on the density data obtained by the conversion unit converting the read data. A storage unit is configured to store a first conversion condition corresponding to a specific recording medium. A second generation unit is configured to control the image forming unit to form a first image pattern on the specific recording medium and to form a second image pattern on another recording medium, different from the specific recording medium, and to generate a second conversion condition corresponding to the other recording medium using first read data, second read data, and the first conversion condition stored in the storage unit, the first read data being obtained by the reading unit reading the first image pattern on the specific recording medium, and the second read data being obtained by the reading unit reading the second image pattern on the other recording medium. A control unit is configured to control a process condition used in a case when the image forming unit forms the first image pattern and the second image pattern so that the density of the first image pattern and the second image pattern formed by the image forming unit is higher than the density of the image formed by the image forming unit. The first conversion condition is used for converting read data of the measurement image on the specific recording medium into density data on the specific recording medium. The second conversion condition is used for converting read data of the measurement image on the other recording medium into density data on the specific recording medium.

Further features of the present invention will become apparent from the following description of exemplary embodiments (with reference to the attached drawings).

DESCRIPTION OF THE EMBODIMENTS

The following describes embodiments of the present invention. The individual embodiments described below are useful in understanding various concepts of the present invention, such as a superordinate concept, an intermediate concept, and a subordinate concept. The technical scope of the present invention is defined by the claims, and is not limited by the individual embodiments described below.

Embodiment 1

The following describes an embodiment in which the present invention is applied to a color copier of an electrophotographic scheme. Note that the present invention is applicable to any image forming apparatus that needs calibration. In other words, the image forming scheme is not limited to an electrophotographic scheme, and may be any other scheme, such as an inkjet scheme or an electrostatic recording scheme. The present invention is applicable to not only an image forming apparatus that forms a multicolor image, but also, an image forming apparatus that forms a monochrome image. The image forming apparatus may be commercially available as, for example, a printing apparatus, a printer, a copier, a multifunction peripheral, or a facsimile. A recording medium is referred to as "recording medium", "recording material", "paper", "sheet", "transfer material", or "transfer paper". A recording medium may be made of paper, fiber, film, resin, or the like.

[Basic Hardware Structure]

Figure 1:
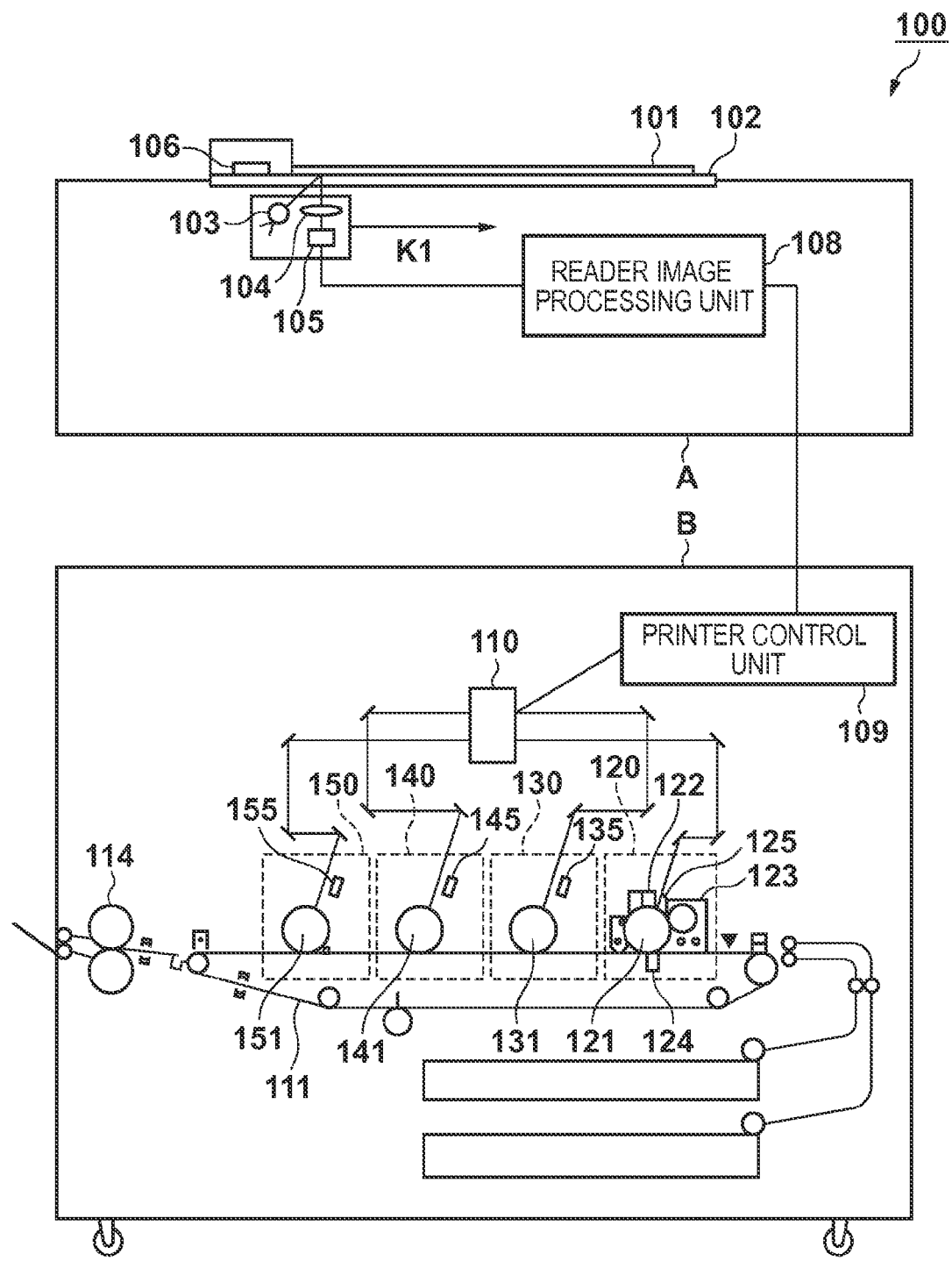
FIG. 1 is a diagram showing a structure example of a color copier.

An image forming apparatus 100 shown in FIG. 1 includes a reader unit A that reads an image from an original, and a printer unit B that forms the image obtained by the reader unit A on a recording medium. The reader unit A reads a reference white board 106 before reading an original 101 placed on a platen glass 102, and performs shading correction. A light source 103 irradiates the original 101 with light, and the reflected light forms an image on a CCD sensor 105 via an optical system 104. A reading unit, such as the CCD sensor 105, moves in the direction of arrow K1, to convert the original to an electrical signal per line. Here, the original may be moved instead of the reading unit. A reader image processing unit 108 converts the electrical signal to an image signal.

Figure 2:
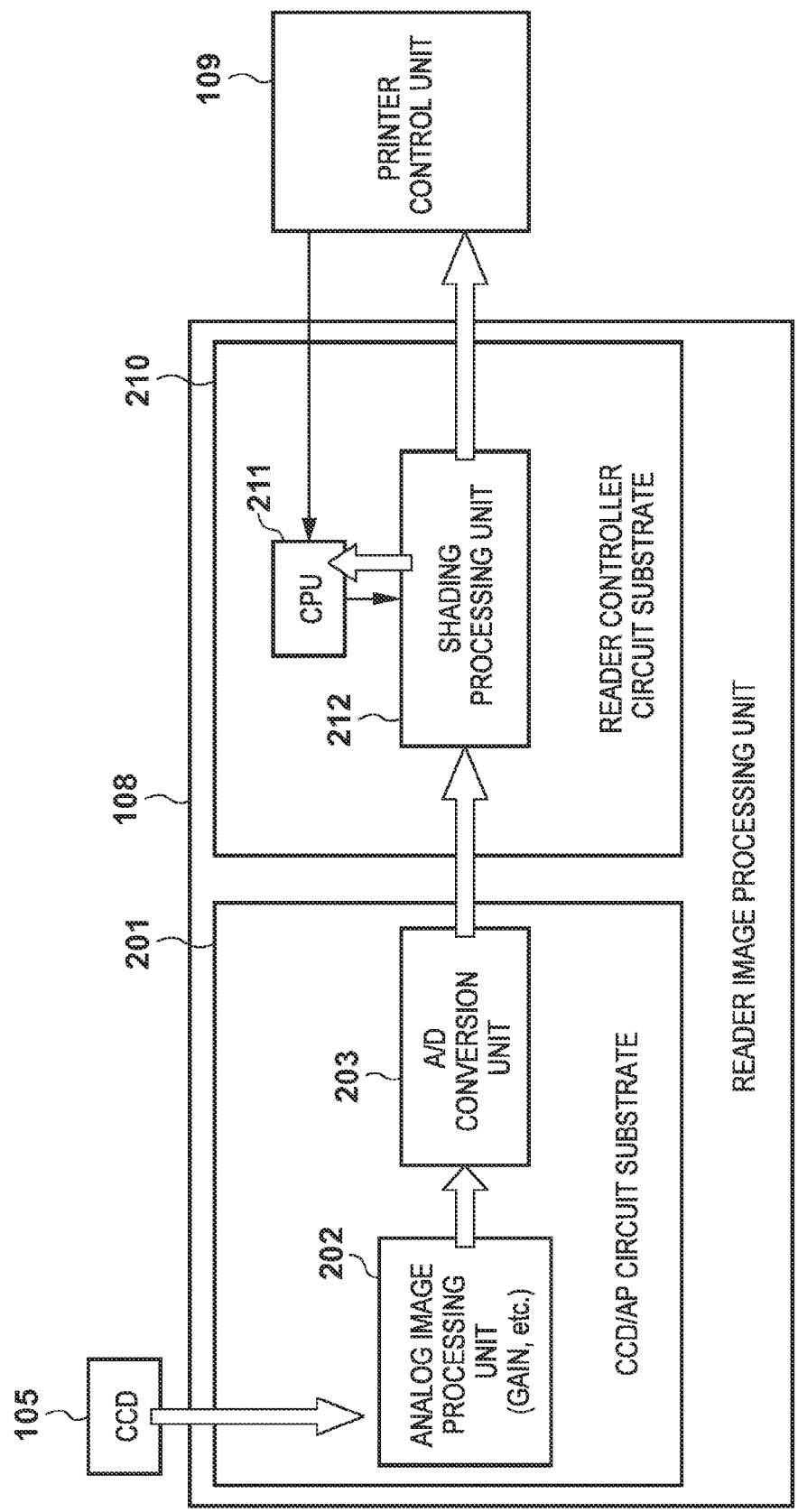
FIG. 2 is a block diagram showing a reader image processing unit.

In FIG. 2, an analog image processing unit 202 in a CCD/AP substrate 201 adjusts the gain, etc., of the image signal obtained by the CCD sensor 105. An A/D conversion unit 203 converts the adjusted image signal to a digital image signal, and outputs the digital image signal to a reader controller substrate 210. A shading processing unit 212 in the reader controller substrate 210 performs shading correction on the image signal under control of a CPU 211, and outputs the corrected image signal to a printer control unit 109 in the printer unit B. At this point, the output image signal is composed of luminance information of each of R, G, and B.

The printer unit B is described next. In FIG. 1, the printer control unit 109 converts the image signal to a laser drive signal. The printer control unit 109 controls a polygon scanner 110 based on the laser drive signal. The polygon scanner 110 includes a light source, such as a semiconductor laser. The polygon scanner 110 scans each of photosensitive drums 121, 131, 141, and 151 of respective image forming units 120, 130, 140, and 150 with a laser beam, to form an electrostatic latent image. The polygon scanner 110 functions as an exposure unit that exposes an image carrier. The polygon scanner 110 is called an "exposure device" or an "optical scanning device". The image forming units 120, 130, 140, and 150 correspond to yellow (Y), magenta (M), cyan (C), and black (Bk), respectively. Since the image forming units 120, 130, 140, and 150 have substantially the same structure, only the image forming unit 120 corresponding to yellow is described below. A primary charger 122 is an example of a charging unit that uniformly charges the image carrier, and charges the surface of the photosensitive drum 121 to a predetermined potential. A developer 123 is an example of a developing unit that develops a latent image formed on the image carrier into a toner image, and develops an electrostatic latent image on the photosensitive drum 121 to form a toner image. A transfer blade 124 is an example of a transfer unit that transfers the toner image onto a recording medium, and transfers the toner image on the photosensitive drum 121 onto a recording medium on a transfer belt 111 through discharge from the back of the transfer belt 111. A fixer 114 fixes the toner image onto the recording medium. The fixer 114 functions as a fixing unit that fixes the toner image onto the recording medium.

The photosensitive drums 121, 131, 141, and 151 are respectively provided with surface electrometers 125, 135, 145, and 155, each for measuring the corresponding surface potential. The surface electrometers 125, 135, 145, and 155 are each used to adjust the contrast potential. In a case when the image forming apparatus increases the contrast potential, the amount of toner adhering to the surface of the photosensitive drum increases, resulting in higher image density. In a case when the image forming apparatus decreases the contrast potential, the amount of toner adhering to the surface of the photosensitive drum decreases, resulting in lower image density.

Figure 3:
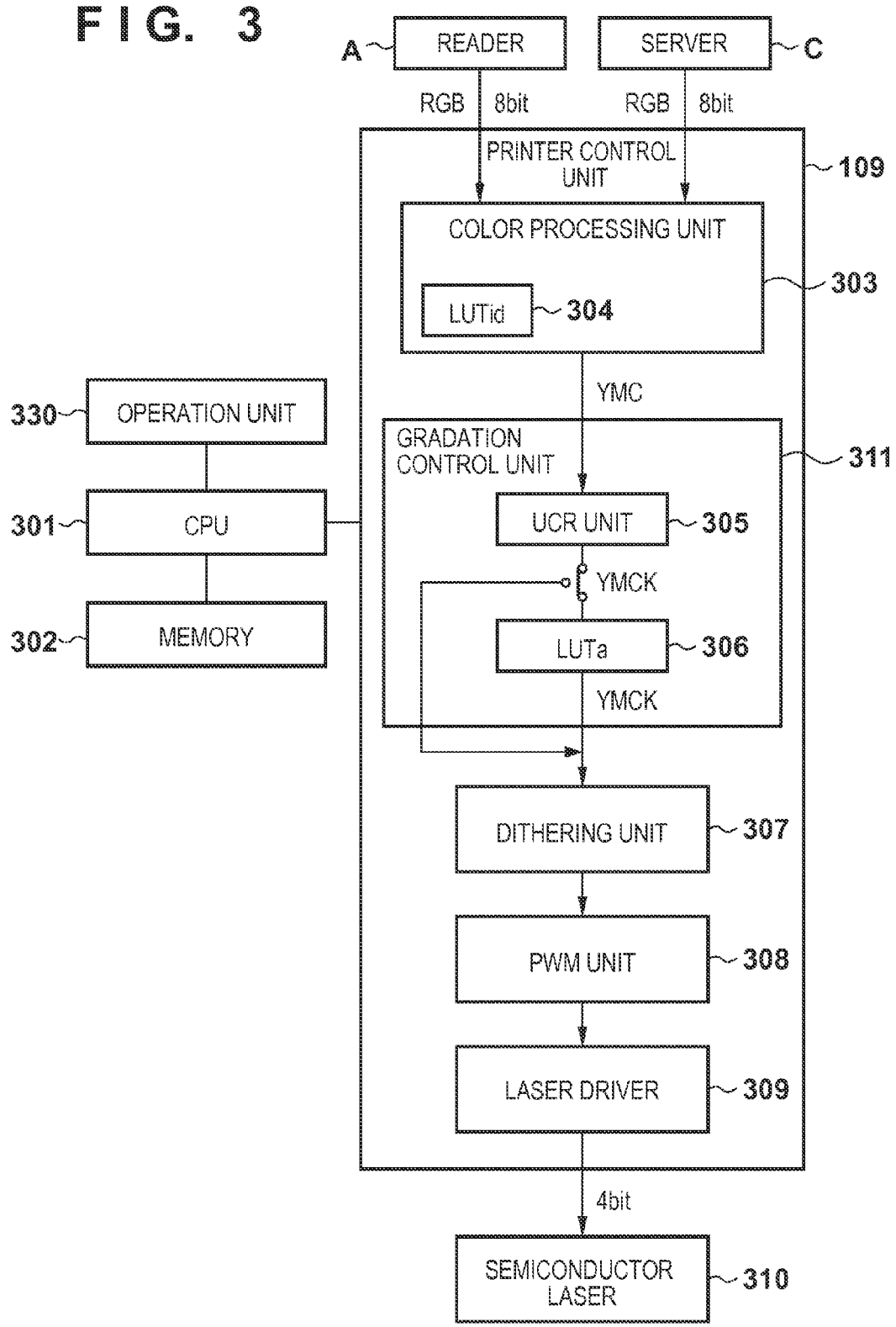
FIG. 3 is a block diagram showing a printer control unit.

In FIG. 3, a CPU 301 integrally controls the units in the printer control unit 109. A memory 302 is a ROM or a RAM, and stores a control program and various data. The memory 302 functions as a storage unit that stores a first conversion condition corresponding to a specific recording medium, where the first conversion condition is an example of an LUTid(X). An operation unit 330 includes a display device for outputting information to a user, and an input device for receiving input from the user. The user operates the operation unit 330, to instruct the CPU 301 to perform calibration or a process of adding a recording medium for calibration.

A color processing unit 303 in the printer control unit 109 receives an image signal processed by the reader A, a print server C, a host computer, or the like. The color processing unit 303 functions as a conversion unit that converts read data to density data using a conversion condition corresponding to a recording medium. In more detail, the color processing unit 303 applies image processing and color processing to the received image signal, so as to obtain a desired output in the case when the printer has ideal output characteristics. While the received signal has eight bits to express the number of levels of gradation, the color processing unit 303 extends it to ten bits for improved accuracy. After this, a dithering unit 307 dithers the image signal, to convert it to a 4-bit signal. An LUTid 304 is a luminance-density conversion table for converting luminance information included in the image signal from the reader A to density information. Although the LUTid 304 is initially provided for a specific recording medium, the LUTid 304 is also added as a result of a process of adding any recording medium in this embodiment.

A gradation control unit 311 includes a UCR unit 305 and an LUTa 306, and corrects the image signal so that the printer unit B supports ideal characteristics. The LUTa 306 is a 10-bit conversion table (correction condition) for correcting density characteristics, and is used particularly to change the y characteristics of the printer unit B. The gradation control unit 311 is a correction unit that corrects image data using a correction condition. The printer unit B is an example of an image forming unit that forms an image on a recording medium based on the image data corrected by the correction unit. The UCR unit 305 is a circuit that limits the total image signal level by regulating the integration value of image signals in each pixel. In the case when the sum total exceeds a prescribed value, the UCR unit 305 performs an under color removal (UCR) process of replacing a predetermined amount of CMY signals with a K signal, to reduce the total image signal level. This regulation of the total image signal level is intended to regulate the amount of applied toner in the image formation by the printer unit B. The operation of the printer unit B is optimized in this embodiment to prevent an image defect, and the like, caused by the amount of applied toner exceeding a prescribed amount.

The dithering unit 307 dithers the signal output from the gradation control unit 311, and a PWM unit 308 converts the dithered signal to a laser drive signal. A laser driver 309 causes the semiconductor laser to emit light based on the laser drive signal. The dithering unit 307 performs a halftone process for converting a 10-bit image signal to 4-bit data.

[Control of Process Condition]

The present invention has a feature of optimizing the printer characteristics by calibration using any recording medium. Calibration using a specific recording medium X set beforehand is described first. A first calibration function of controlling the contrast potential and a second calibration function of controlling the image data y correction circuit (the LUTa 306) are included in this embodiment.

I. First Calibration

Figure 4:
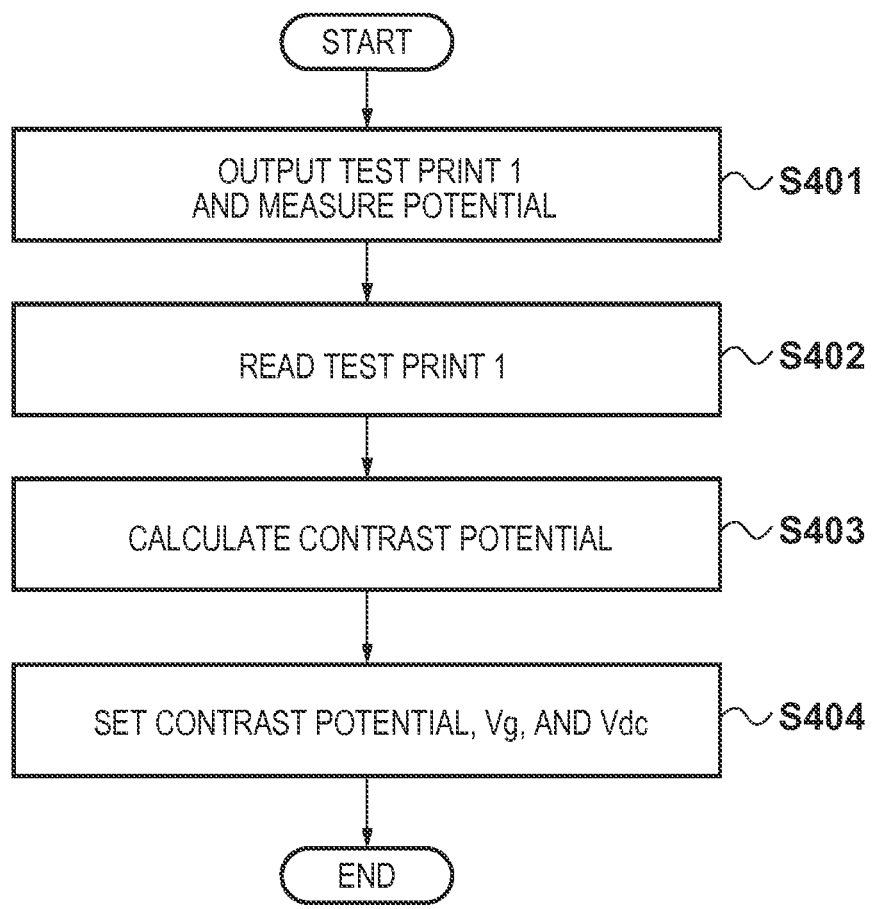
FIG. 4 is a flowchart showing a contrast potential calculation process in first calibration.

The first calibration is the control performed by the CPU 301 to determine a contrast potential based on first luminance information obtained from a measurement image formed on a recording medium (FIG. 4). The CPU 301 functions as a first calibration unit that performs the first calibration. The CPU 301 is an example of an obtaining unit that obtains read data obtained by the reading unit reading the measurement image formed on the recording medium by the image forming unit.

In step S401, the CPU 301 outputs a first test print, and measures the photosensitive drum surface potential. For example, the CPU 301 outputs first measurement image data to the color processing unit 303, and causes the printer unit B to form a first test pattern (first measurement image) on the specific recording medium X. The recording medium X on which the first test pattern has been formed corresponds to the first test print. The contrast potential used when the first test print is output is set to an initial value that is estimated to achieve target density based on the surrounding environment (e.g., absolute moisture) of the image forming apparatus. Here, the memory 302 stores contrast potential values corresponding to various environments. The CPU 301 measures the absolute moisture, and determines the contrast potential corresponding to the measured absolute moisture. For example, the first test pattern includes a band-like measurement image α having a halftone density of Y, M, C, and Bk, and a measurement image β having a maximum density (e.g., an image signal level=255) of each of Y, M, C, and Bk. The surface electrometers 125, 135, 145, and 155 respectively measure the surface potentials of the areas of the photosensitive drums 121, 131, 141, and 151, on each of which the electrostatic latent image of the measurement image β is formed.

In step S402, the reader A reads the output first test print, and passes RGB data (data corresponding to the intensity of light with the wavelength of each of red, green, and blue) to the CPU 301 of the printer control unit 109. The CPU 301 converts the RGB data to density data, using the LUTid(X) provided beforehand for the specific recording medium X. The LUTid(X) is the first conversion condition for converting read data on the specific recording medium X to density data. An LUTid(Z) (described later), for enabling any recording medium Z to be used in calibration, is created by changing the LUTid(X).

Figure 5:
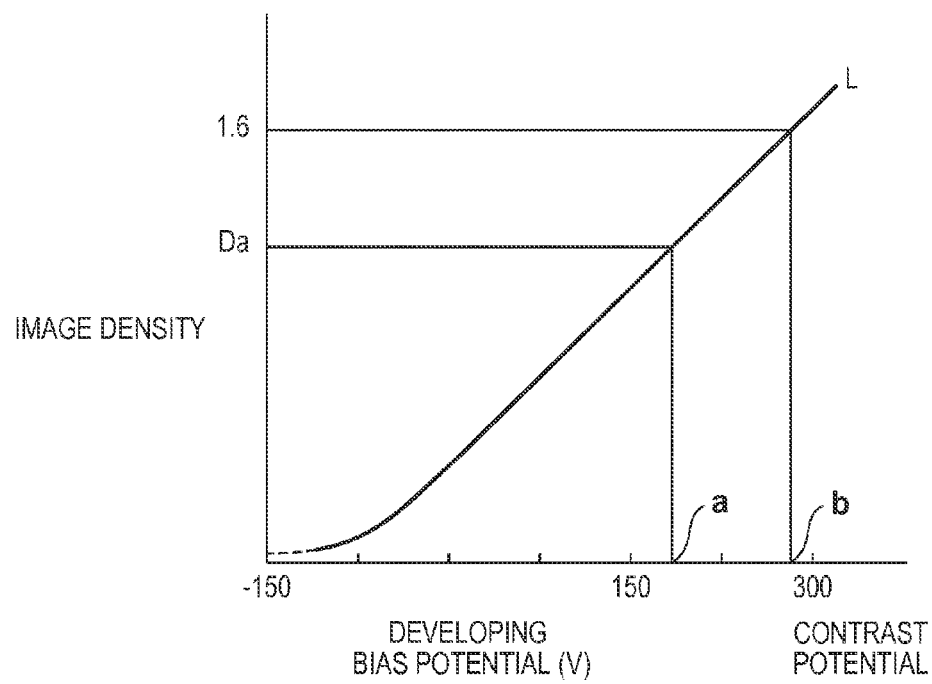
FIG. 5 is a diagram showing the relation between contrast potential and image density information.

In step S403, the CPU 301 calculates a contrast potential b corresponding to a target maximum density. In FIG. 5, the horizontal axis represents the developing bias potential, and the vertical axis represents the image density. The contrast potential is the difference between the developing bias potential and the photosensitive drum surface potential when a semiconductor laser 310 of each color emits light at the maximum level, after the photosensitive drum is primary-charged. Let Da be the density of the measurement image β formed using a contrast potential a. In this case, the image density around the maximum density (0.8 to 2.0 in density) is linear with respect to the contrast potential, as indicated by the solid line L. The solid line L is determined by the contrast potential a and the maximum density Da. In this embodiment, the target maximum density is 1.6, as an example. The CPU 301 calculates the contrast potential b corresponding to the target maximum density, based on the solid line L. Here, a table or a function corresponding to the solid line L is stored in the memory 302 beforehand. The contrast potential b is calculated using, for example, the following expression (1):

$$b=(a+ka)\times 1.6/Da \quad (1)$$

where ka is a correction coefficient that is determined according to the type of developing method.

In step S404, the CPU 301 determines a grid potential Vg and a developing bias potential Vdc from the contrast potential b, and sets these values.

The CPU 301 thus functions as a determination unit that determines a process condition used when the image forming unit forms the image, based on the read data obtained by the obtaining unit.

Figure 6:
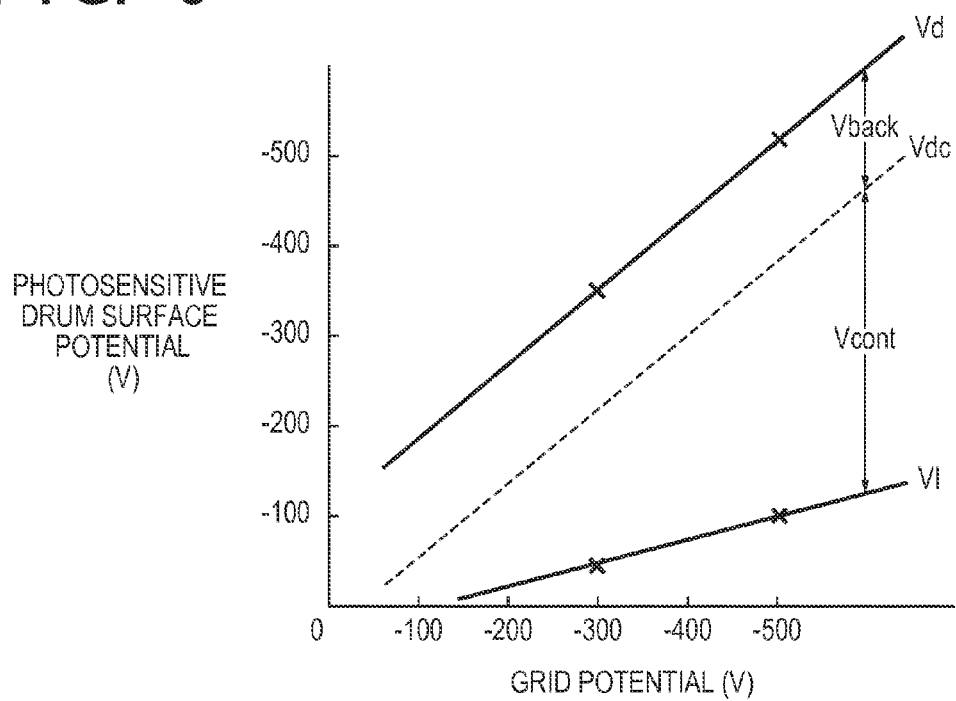
FIG. 6 is a diagram showing the relation between grid potential and photosensitive drum surface potential.

In FIG. 6, the CPU 301 sets the grid potential Vg to −300 V, performs a scan with the minimum light emission pulse level of the semiconductor laser 310 of each color, and measures a surface potential Vd using each of the surface electrometers 125, 135, 145, and 155. The CPU 301 also sets the grid potential Vg to −300 V, and measures a surface potential Vl when the light emission pulse level of the semiconductor laser 310 of each color is at the maximum, using each of the surface electrometers 125, 135, 145, and 155. The CPU 301 equally measures the surface potentials Vd and Vl when the grid potential Vg is set to −700 V. The CPU 301 can determine the relation between the grid potential and the photosensitive drum surface potential shown in FIG. 6, by interpolation or extrapolation using the data of −300 V and the data of −700 V. This control for obtaining the potential data is referred to as "potential measurement control".

The difference voltage between the developing bias Vdc and the surface potential Vl is determined as a contrast potential Vcont. The maximum density is higher when the contrast potential Vcont is higher. The CPU 301 determines the grid potential Vg corresponding to the determined contrast potential b, from the relation shown in FIG. 6. The CPU 301 determines the corresponding surface potential Vd from the determined grid potential Vg and the relation shown in FIG. 6. The CPU 301 further determines the developing bias Vdc, by subtracting Vback (e.g., 150 V) from the surface potential Vd. Here, Vback is a potential determined so that no fogging toner adheres on an image.

II. Second calibration

Figure 7:
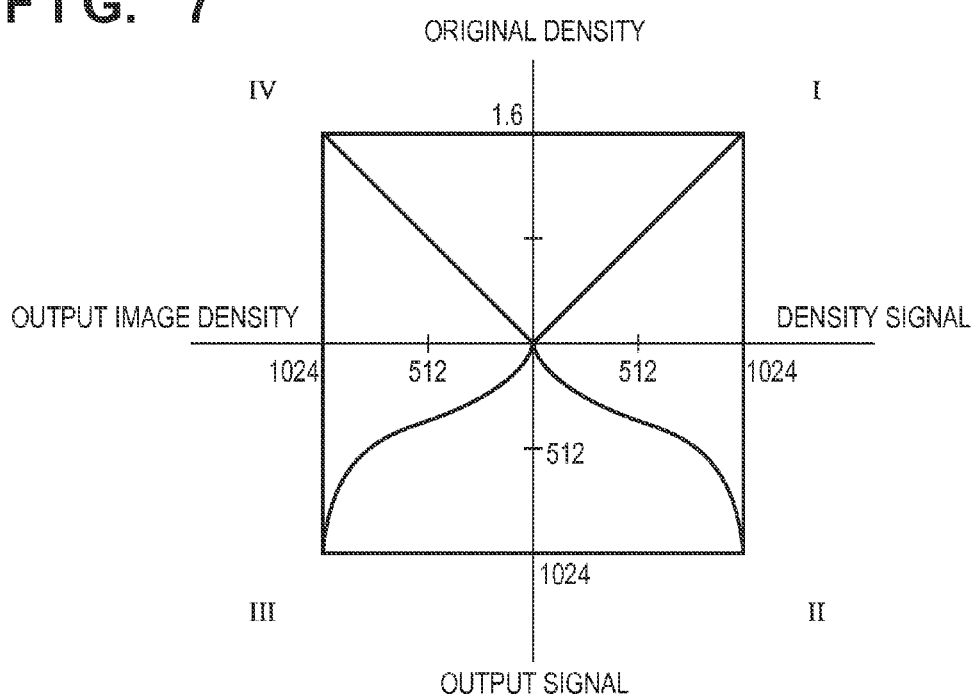
FIG. 7 is a characteristic conversion chart showing characteristics necessary for reproducing the density of an original image.

In FIG. 7, Quadrant I represents the characteristics of the reader unit A that converts original density (toner image density in an original) to a density signal. Quadrant II represents the characteristics of the LUTa that converts the density signal to a laser output signal. Quadrant III represents the characteristics of the printer unit of the image forming apparatus 100 that converts the laser output signal to output image density (toner image density in a copy). Quadrant IV represents the relation between the output image density and the original density. These characteristics indicate the overall gradation characteristics in the image forming apparatus 100. Note that the number of levels of gradation is two hundred fifty-six in the case when an 8-bit digital signal is used.

In the image forming apparatus 100, the distortion of the recording characteristics in the printer unit B in Quadrant III is corrected by the gradation control unit 311 in Quadrant II, in order to make the gradation characteristics in Quadrant IV linear (that is, to match the gradation characteristics of the copy to the gradation characteristics of the original). An LUTa(X) can be easily created simply by replacing the input and the output with each other in the characteristics of Quadrant III obtained in the case when a test print is output without the operation of the gradation control unit 311. In this embodiment, while the number of output levels of gradation is two hundred fifty-six (eight bits), the number of levels of gradation in the gradation control unit 311 is one thousand twenty-four because the gradation control unit 311 processes a 10-bit digital signal.

Figure 8:
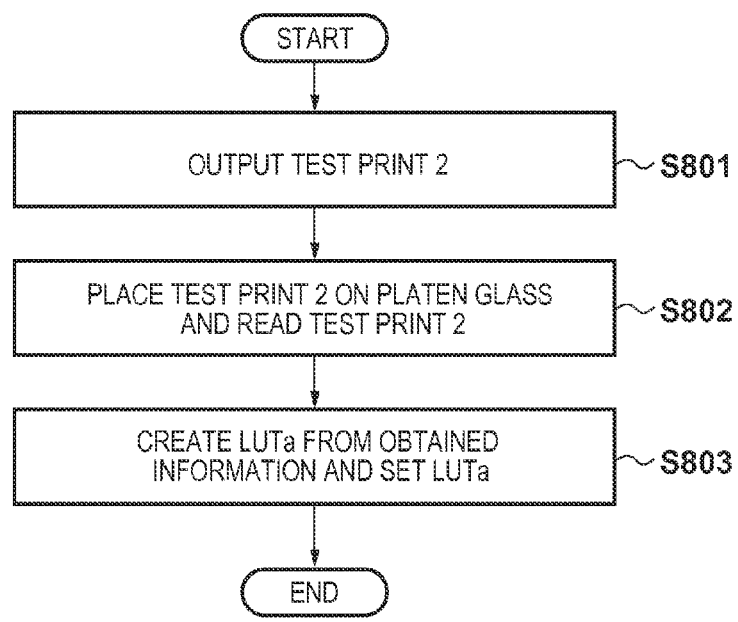
FIG. 8 is a flowchart showing a second calibration.

The second calibration is the control performed by the CPU 301 to determine an image forming condition relating to the gradation characteristics of the image forming apparatus based on second luminance information obtained from a measurement image formed on a recording medium (FIG. 8). The second calibration is typically performed after the first calibration.

In step S801, the CPU 301 outputs a second test print. For example, the CPU 301 outputs second measurement image data to the color processing unit 303, and causes the printer unit B to form a second test pattern (second measurement image) on the specific recording medium X. The recording medium X, on which the second test pattern has been formed, corresponds to the second test print. Here, the CPU 301 causes the printer unit B to form the second test pattern without using the LUTa in the gradation control unit 311. The UCR unit 305 outputs a density signal YMCK to the dithering unit 307, without passing it through the LUTa 306.

For example, the second test pattern formed in the second test print has a measurement image of four columns and sixteen rows (i.e., sixty-four levels of gradation) for each color of Y, M, C, and Bk. A low density region (e.g., the region from level 1 to level 128) of two hundred fifty-six levels of gradation is predominantly assigned to the measurement image of sixty-four levels of gradation, as an example. This enables favorable adjustment of the gradation characteristics in the low density region. The second test pattern may be provided for each of low resolution (160 to 180 lpi) and high resolution (250 to 300 lpi), where lpi stands for lines per inch. An image for each of high resolution and low resolution can be formed by the dithering unit 307 performing dithering with a parameter that achieves the corresponding resolution. Here, a gradation image may be created with a resolution of 160 to 180 lpi, and a line image, such as characters, with a resolution of 250 to 300 lpi. A test pattern of the same levels of gradation (level 1 to level 256) is output with each of the two types of resolutions. In the case when the gradation characteristics are significantly different depending on the resolution, the levels of gradation are set according to the resolution. If the printer unit B is capable of forming images with three or more types of resolutions, the test print for the second calibration may be separated into a plurality of pages.

In step S802, the reader A reads the second test pattern. The color processing unit 303 receives the read data (luminance data of red, green, and blue) of the second test pattern. The color processing unit 303 converts the luminance data of the second test pattern to density data, using the LUTid (X). The color processing unit 303 thus functions as a conversion unit that converts read data to density data using a conversion condition corresponding to a recording medium. The LUTid(X) is an example of the first conversion condition, and is a table for converting read data of the measurement image on the specific recording medium to density data of the measurement image on the specific recording medium.

In step S803, the CPU 301 creates a table indicating the relation between the laser output level and the density, based on the density value, the laser output level used to form the second test pattern, and the position at which each measurement image is formed. The CPU 301 stores the created table in the memory 302. The CPU 301 can thus obtain the characteristics of the printer unit B in Quadrant III shown in FIG. 7. The CPU 301 determines the LUTa by replacing the input (laser output level) and the output (density) in the characteristics with each other, and sets the LUTa in the gradation control unit 311. The CPU 301 is an example of a first generation unit that generates the correction condition based on the density data obtained by the conversion unit converting the read data. Data is not sufficient to calculate the LUTa, and the printer unit B forms a measurement image of only sixty-four levels of gradation in the second calibration. Accordingly, the CPU 301 creates the LUTa by interpolating data of two hundred fifty-six levels of gradation based on data of sixty-four levels of gradation. As a result of the second calibration, the image forming apparatus can obtain the conversion condition for achieving the linear gradation characteristics with respect to the target density.

Though the first calibration and the second calibration are sequentially performed in this embodiment, only one of the first calibration and the second calibration may be performed. According to this embodiment, calibration is performed to effectively correct any short or long-term variations in image density, image reproducibility, or gradation reproducibility, with it being possible to maintain the image quality.

[Process of Adding any Recording Medium]

The case of adding a recording medium usable for calibration is described next. This embodiment has a feature of optimizing the printer characteristics even in the case when calibration is performed using any recording medium Z.

If any recording medium Z is used in calibration that is supposed to use the specific recording medium X (dedicated paper for calibration), a problem arises in the corrected output characteristics of the printer. Regarding the specific recording medium X, the amount of applied toner is known, and calibration is designed to cause no image defect. Hence, calibration using the specific recording medium X enables the printer characteristics to be adjusted to achieve a desired amount of toner. Regarding any recording medium Z, on the other hand, the relation between the density and the amount of applied toner is unknown. If any recording medium Z other than the specific recording medium X is used in calibration that is supposed to use the specific recording medium X, there is a possibility that the amount of applied toner exceeds its tolerable range. This can cause a fixing failure upon transfer or fixing, leading to an image defect.

Figure 9:
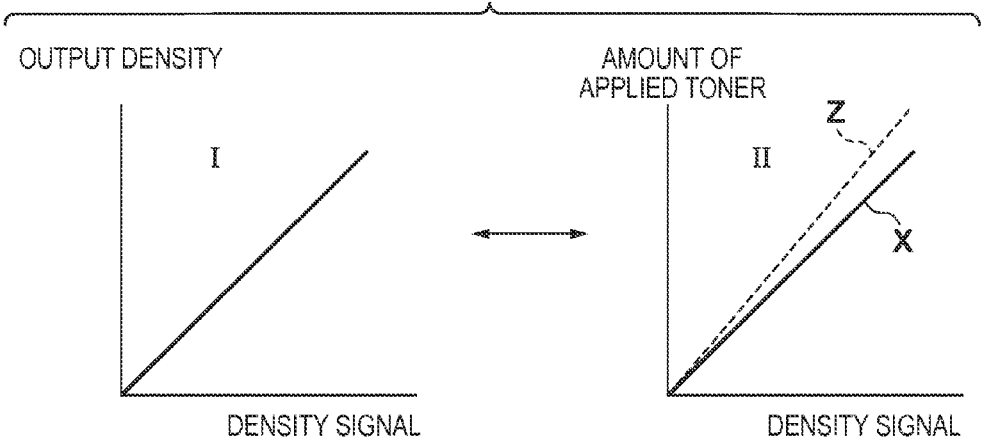
FIG. 9 is a diagram for describing the difference in characteristics between recording media.

In the case when the amount of applied toner for an image formed on the specific recording medium X and the amount of applied toner for the image formed on any recording medium Z are the same, the density of the image formed on the recording medium Z is relatively low. In the case when the output characteristics of an image of a predetermined color formed on the specific recording medium X and the output characteristics of the image of the predetermined color formed on the other recording medium Z are adjusted as in (I) in FIG. 9, the amount of applied toner for each recording medium with respect to the density signal is as shown in (II) in FIG. 9. In the drawing, the amount of applied toner for the other recording medium Z is larger than the amount of applied toner for the specific recording medium X. When a secondary color, a tertiary color, etc., are output in such a state, there is a possibility that the amount of toner adhering to the recording medium Z exceeds the tolerable range and causes a fixing failure. It is, however, much more convenient for the user if the user can perform calibration using the recording medium Z, which is easily available to the user.

In this embodiment, second conversion setting information is generated, so that the same LUTa as in the case when calibration is performed using the specific recording medium X is created, even in the case when calibration is performed using any recording medium Z. The total image signal level is regulated immediately before the LUTa, thus keeping the amount of applied toner from exceeding the tolerable range. First, the CPU 301 forms the same measurement image on each of the specific recording medium X and the recording medium Z, using the same image signal (measurement image signal). The same image signal (measurement image signal) is used here, so that the specific recording medium X and the recording medium Z have the same amount of applied toner. The CPU 301 causes the reader unit A to read the measurement image formed on the specific recording medium X and the measurement image formed on the recording medium Z, and determines the luminance data of the measurement image formed on each of the recording media. The CPU 301 then calculates the luminance difference between the luminance values, and corrects the difference using the LUTid. For example, the CPU 301 creates the LUTid(Z) for the recording medium Z, by adding the difference to the LUTid(X) for the specific recording medium X. Upon calibration using the recording medium Z, the CPU 301 sets the LUTid(Z) in the color processing unit 303 as the LUTid 304. The LUTa achieving the same gradation characteristics as in the case when calibration is performed using the specific recording medium X can be created in this way. The LUTid(Z) is an example of a second conversion condition, and is a table for converting read data of the measurement image on the other recording medium to density data of the measurement image on the other recording medium.

Moreover, the accuracy of the created LUTid in a high density region is improved in this embodiment. In other words, the image forming condition applied to form a pattern on each of the specific recording medium X and the recording medium Z upon registration of the recording medium Z is set to be different from the image forming condition used in a copy mode of forming an image based on an original read using the reader A or a print mode of forming an image based on image data transferred from an external PC. In detail, the image forming condition is temporarily changed so that the maximum density of a measurement image formed in the addition mode is higher than the maximum density of an image formed in the image forming mode, such as the copy mode or the print mode. The density value mentioned here is optical density. The CPU 301 is an example of a control unit that controls each of the density of a first image pattern and the density of a second image pattern formed by the image forming unit in the addition mode, to be the predetermined density, which is higher than the density of an image formed by the image forming unit in the image forming mode. Thus, the maximum density of an image is increased when the image forming apparatus switches from the image forming mode to the addition mode.

Figure 13A:
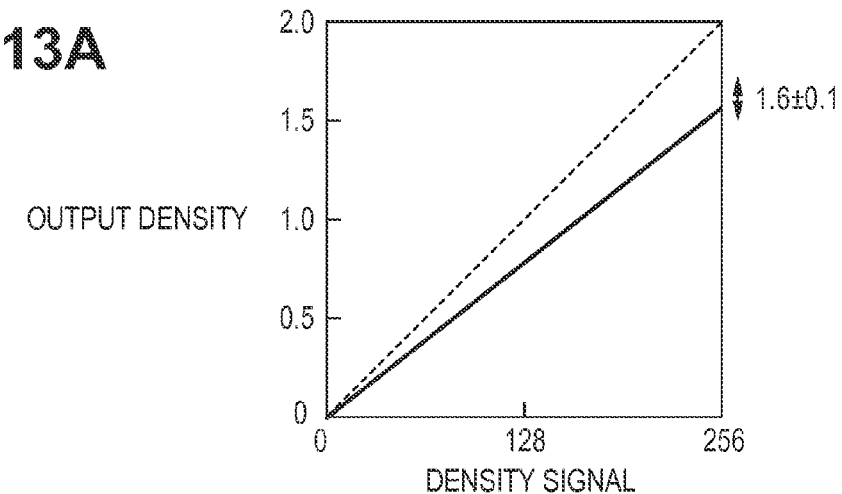
FIGS. 13A and 13B are diagrams for describing a method of creating an LUTid in high density.
Figure 13B:
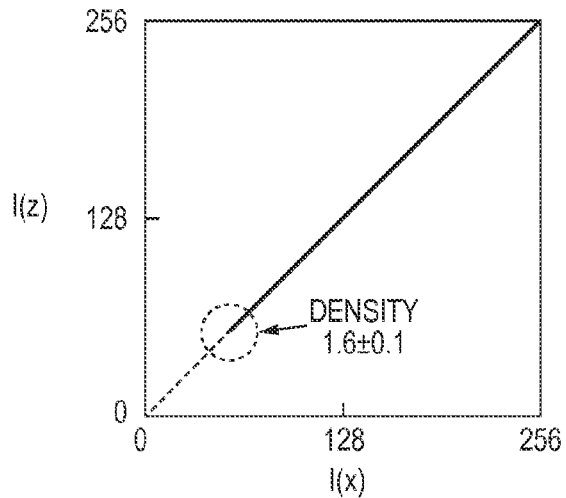

The reason for improving the accuracy in the high density region is described below, with reference to FIGS. 13A and 13B. Suppose the target value of the maximum density of an image formed in the copy mode or the print mode is 1.6. If a measurement image is formed using an image forming condition set to achieve this target value, an accumulation of various error factors leads to a possibility that the maximum density of a measurement image actually formed on the recording medium X is about 1.5 to 1.7, as indicated by the solid line in FIG. 13A. The relation between the luminance value I(X) of the recording medium X and the luminance value I(Z) of the recording medium Z used when creating the LUTid is indicated by the solid line in FIG. 13B. Here, the luminance value I of the measurement image decreases in the case when the density value of the measurement image increases, and increases in the case when the density value of the measurement image decreases. The density of the measurement image formed on the recording medium X is detected to be about 1.5 to 1.7, as indicated by the solid line in FIG. 13B. Since the density exceeding 1.7 is undetected, the CPU 301 needs to calculate the density by interpolation. The relation between the luminance value I(X) and the luminance value I(Z) is obtained by interpolation, as indicated by the dotted line in FIG. 13B. It should be noted that, in the interpolation, the correspondence relation between the luminance values I(X) and I(Z) is interpolated, so that the luminance difference (the difference between the luminance signal and the density signal) in the high density region is 0 when the luminance values I(X) and I(Z) are both 0. For example, in the case when the maximum density of the measurement image when the LUTid is created is 1.5, the part corresponding to the density greater than or equal to 1.5 in the LUTid is created based on predicted values (interpolated values). In the case when the target value of the maximum density of the image formed in the copy mode or the print mode is 1.6, the maximum density of the measurement image formed in the first calibration is about 1.6, and might be about 1.5. In such a case, the first calibration lacks sufficient accuracy.

Accordingly, in this embodiment, the CPU 301 sets the target value of the maximum density of the measurement image to be higher than the target value of the maximum density of the image formed in the copy mode or the print mode, in the process of adding any recording medium Z. As a result, the density characteristics of the image pattern are closer to the density characteristics indicated by the dotted line in FIG. 13A. Since the data of the high density region used in the first calibration are actually measured values, the accuracy in creating the LUTid is improved as compared with the case of using predicted values. In this embodiment, given that the target value of the maximum density of the image formed in the copy mode or the print mode is 1.6, the CPU 301 sets the image forming condition so that the maximum density of the measurement image formed in the case of performing the process of adding any recording medium Z is about 1.7 to 2.0.

Figure 10:
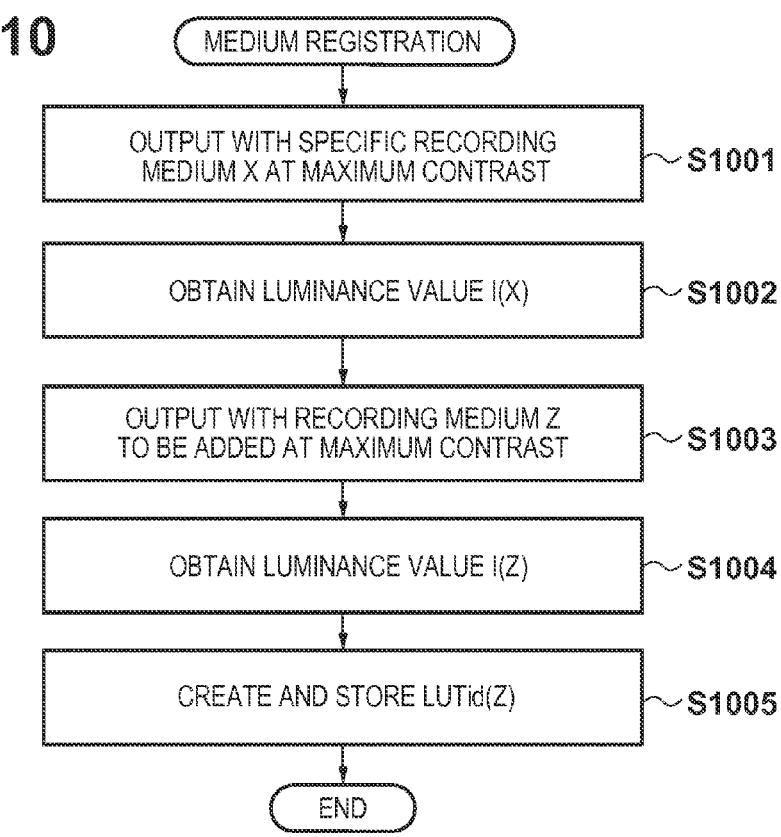
FIG. 10 is a flowchart showing a recording medium addition process.

In FIG. 10, the CPU 301 starts the addition process, when instructed, to additionally register a recording medium for calibration through a button of the operation unit 330 provided on the image forming apparatus 100.

In step S1001, the CPU 301 selects the specific recording medium X, and forms an image pattern (measurement image) on the specific recording medium X. The image pattern is, for example, the second test pattern used in the second calibration. The image forming condition when forming the image pattern (measurement image) is set to be different from the image forming condition for forming an image in the copy mode or the print mode, to ensure the accuracy in the high density region mentioned above. For example, the CPU 301 sets the light emission level (light emission intensity) of the semiconductor laser 310 of each color to the maximum settable level and sets the absolute value of the grid potential Vg to the maximum settable level, so as to achieve the maximum contrast settable in the image forming apparatus 100. The maximum contrast (corresponding to Vcont) is obtained when the absolute value of the grid potential Vg is at the maximum, as shown in FIG. 6. For example, suppose the grid potential Vg is settable in the range of −150 V to −700 V. In this case, the grid potential Vg is set to −700 V. The use of such an image forming condition enables the maximum density of the image pattern (measurement image) to be about 1.7 to 2.0, even when various error factors are accumulated.

In step S1002, the CPU 301 controls the reader unit A to read the image pattern formed on the specific recording medium X, to obtain the read luminance value I(X). The luminance value I(X) corresponds to first luminance information obtained from the image formed on the specific recording medium X.

In step S1003, the CPU 301 selects any recording medium Z, and forms an image pattern (measurement image) on the recording medium Z. The image pattern formed on the recording medium Z is the second test pattern. The image forming condition, when forming the image pattern (measurement image), is the same as the image forming condition used for the specific recording medium X. In detail, the light emission pulse level of the semiconductor laser 310 of each color is set to the maximum level, and the grid potential Vg is set to −700 V. The second test pattern is thus formed on the recording medium Z. The printer unit B corresponds to an image forming unit that forms an image on each of a specific recording medium usable for calibration and any recording medium using the same image signal, to add any recording medium Z as a recording medium usable for calibration.

In step S1004, the CPU 301 controls the reader unit A to read the image pattern formed on the recording medium Z, to obtain the read luminance value I(Z). The luminance value I(Z) corresponds to second luminance information obtained from the image formed on the recording medium. The image data and the image processing used to obtain the read luminance value I(Z) are the same as those used to obtain the read luminance value I(X).

In step S1005, the CPU 301 applies the following method to the read luminance values I(X) and I(Z), to create the LUTid(Z) used when performing calibration with the recording medium Z, and stores the LUTid(Z) in the memory 302 or the color processing unit 303. For example, the LUTid(Z) is created by adding the difference between the luminance values I(X) and I(Z), to the LUTid(X). A detailed method of creating the LUTid(Z) is described below. The LUTid(Z) corresponds to second conversion setting information for converting luminance information to density information for any recording medium Z.

Figure 11:
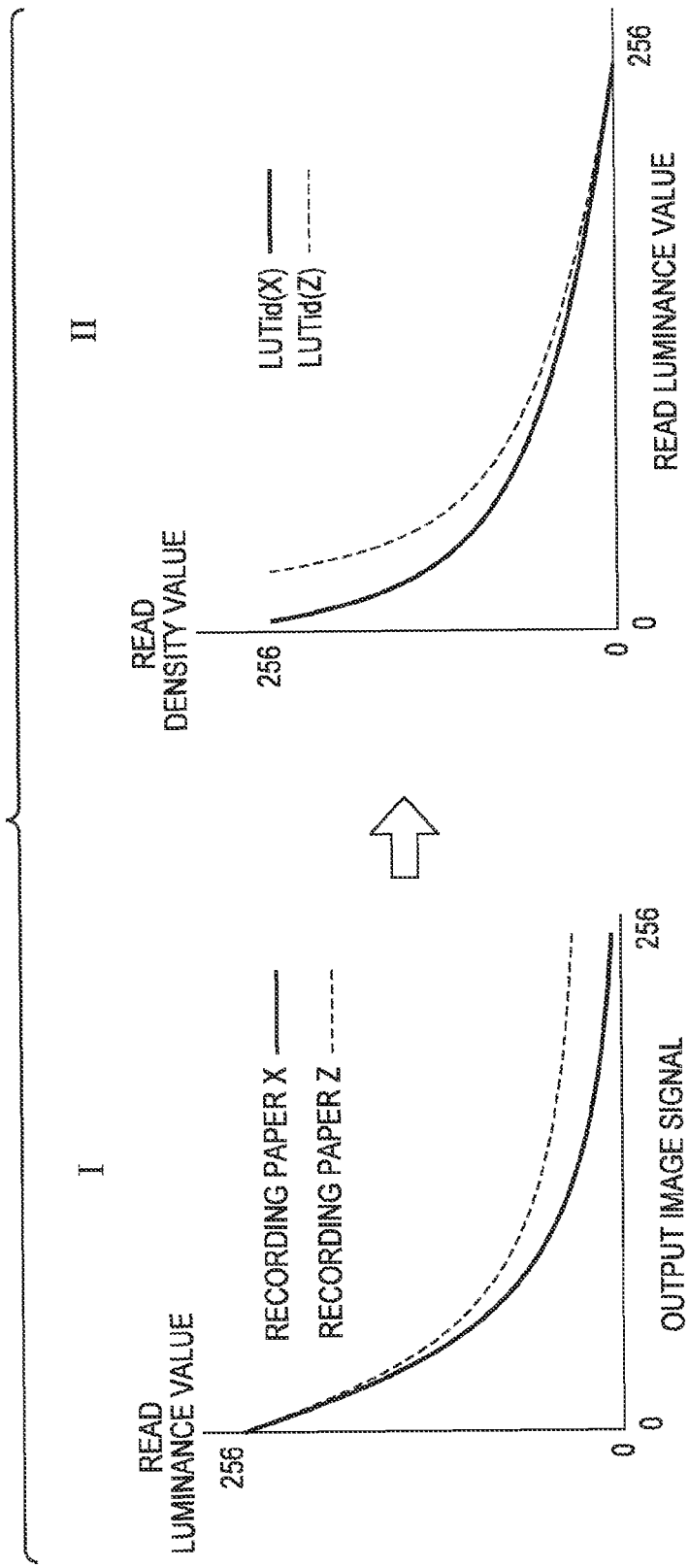
FIG. 11 is a diagram for describing a method of creating an LUTid for any recording medium.

In FIG. 11, (I) shows the relation between the output image signal and the read luminance value, and (II) shows the relation between the read luminance value and the read density value, for each of the specific recording medium X and the recording medium Z. The density value of the recording medium Z is converted to the density value of the recording medium X.

The read luminance value I(X) of the specific recording medium X and the read luminance value I(Z) of the recording medium Z are the luminance values read from the images formed on the recording media X and Z using the same image signal (i.e., the same amount of applied toner). The CPU 301 calculates the difference in luminance between the specific recording medium X and the recording medium Z necessary to achieve the same amount of applied toner, from the luminance values I(X) and I(Z). The CPU 301 thus functions as a first calculation unit that calculates a difference between the first luminance information and the second luminance information. The first luminance information is an example of first read data, and is obtained by the reading unit reading the first image pattern on the specific recording medium. The second luminance information is an example of second read data, and is obtained by the reading unit reading the second image pattern on the other recording medium.

The CPU 301 adds the luminance difference to the LUTid (X), to create the LUTid(Z) for the recording medium Z. The CPU 301 thus functions as a second calculation unit that calculates second conversion setting information by adding the difference to the first conversion setting information. The LUTid(X) corresponds to the first conversion setting information for converting luminance information to density information for the specific recording medium. The CPU 301 also functions as a creation unit that creates second conversion setting information using the first luminance information, the second luminance information, and the first conversion setting information.

The use of the recording medium Z and the LUTid(Z) in combination produces the same calibration result as when the recording medium X and the LUTid(X) are used in combination. This means the LUTa determined using the recording medium Z and the LUTid(Z) in combination is substantially the same as the LUTa determined using the recording medium X and the LUTid(X) in combination. In other words, theoretically, the same LUTa is obtained, even when any recording medium Z is used instead of the specific recording medium X. The LUTa corresponds to the characteristics in Quadrant II shown in FIG. 7. If the printer characteristics in Quadrant III are the same, the LUTa(X) created using the recording medium X and the LUTa(Z) created using the recording medium Z are identical to each other. The CPU 301 functions as a determination unit that determines an image forming condition based on the second conversion setting information. The CPU 301 stores the created LUTid(Z) in the memory 302, in association with the identification information of the added recording medium Z.

Figure 12:
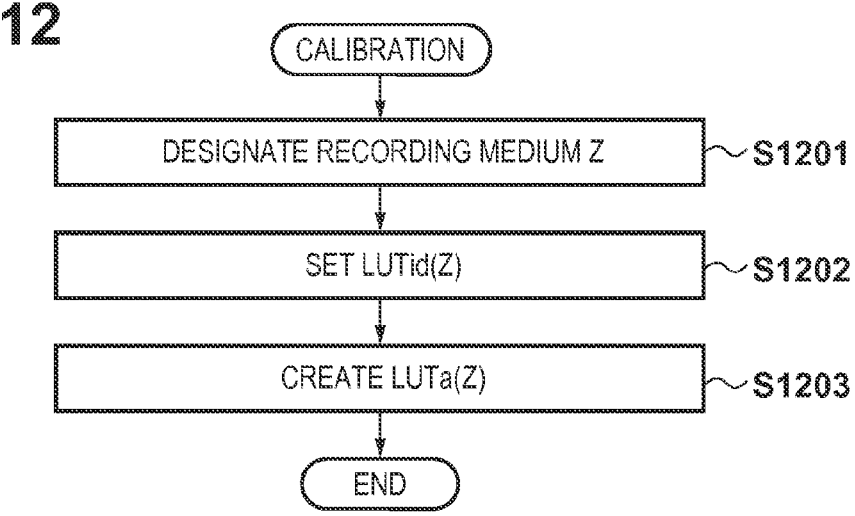
FIG. 12 is a flowchart showing calibration using an added recording medium.

In FIG. 12, in step S1201, the CPU 301 prompts the operator to designate, through the operation unit 330, which recording medium is to be used. In step S1202, the CPU 301 sets the LUTid(X) in the color processing unit 303 in the case when the recording medium X is designated, and sets the LUTid(Z) in the color processing unit 303 in the case when the recording medium Z is designated. The CPU 301 thus functions as a designation unit that designates a recording medium used in calibration. In step S1203, the CPU 301 performs the first calibration (S401 to S404) and the second calibration (S801 to S803). In particular, the LUTa(Z) is created as a result of the second calibration. The color processing unit 303 performs the conversion process using the LUTid corresponding to the recording medium designated by the CPU 301. The color processing unit 303 thus functions as a conversion unit that, when the specific recording medium is designated by the designation unit, converts luminance information obtained from the image formed on the specific recording medium to density information, using the first conversion setting information. The color processing unit 303 also functions as a conversion unit that, when any recording medium is designated by the designation unit, converts luminance information obtained from the image formed on the recording medium to density information, using the second conversion setting information.

According to this embodiment, the second conversion setting information (LUTid(Z)) for the recording medium Z is created from the characteristics (luminance value I(X)) of the specific recording medium X, the characteristics (luminance value I(Z)) of the recording medium Z, and the first conversion setting information (LUTid(X)) for the recording medium X. This enables calibration using the recording medium Z. In particular, the image is formed on each of the recording media X and Z using the same image signal, so that the recording media X and Z have the same amount of applied toner. Since the amount of applied toner is the same, the difference between the luminance values I(X) and I(Z) corresponds to the difference between the LUTid(X) and the LUTid(Z). Hence, adding the difference between the luminance values I(X) and I(Z) to the LUTid(X) yields the LUTid(Z) relatively easily.

Moreover, the common image forming condition (LUTa) applied to the specific recording medium and any recording medium is determined based on the second conversion setting information, with there being no need to provide the image forming condition (LUTa) for each recording medium. In other words, while the LUTid for converting luminance information to density information needs to be provided for each recording medium, the LUTa does not need to be provided for each recording medium. The capability of commonly using the LUTa between a plurality of types of recording media is one of the advantageous effects of the present invention. While the LUTid needs to be switched according to the type of the designated recording medium, the LUTa does not need to be switched according to the type of the designated recording medium. The present invention can, therefore, reduce the amount of memory as compared with other examples, in which a dedicated LUTa is stored for each type of recording medium.

According to this embodiment, the single-color output characteristics of the printer unit B can be accurately adjusted to a desired state. This contributes to more accurate color reproducibility in the case when color management is carried out using an ICC profile in the printer control unit 109, an external controller, or the like. Here, ICC stands for the International Color Consortium.

Though this embodiment describes the case when the image formation and reading on the recording medium X are followed by the image formation and reading on the recording medium Z, in the recording medium addition process, the images may be formed on the recording media X and Z first, and then read from the recording media X and Z. In such a case, either of the recording media X and Z may be processed first.

According to this embodiment, the conversion accuracy of the LUTid in the high density region can be improved. The CPU 301 sets the image forming condition used to form the pattern on each of the specific recording medium X and any recording medium Z when registering the recording medium Z, to be different from the image forming condition used in normal image formation, such as when copying an original. The image forming condition is thus changed when the image forming apparatus 100 changes from the image forming mode of normal image formation to the addition mode. In detail, the CPU 301 temporarily changes the image forming condition, so that the maximum density in pattern image formation is higher than the maximum density in normal image formation. For example, suppose the target value of the maximum density in normal image formation is 1.6. Such output density that covers 1.6, even when various errors occur, can then be achieved. The high density region of the LUTid(Z) is formed based on actually measured values, too, which contributes to higher accuracy in creating the LUTid(Z).

The maximum density can be temporarily increased simply by changing the image forming condition. For example, the laser output may be set to be higher than normal, or the maximum contrast may be set to be higher than normal. When laser light is driven by pulse width modulation, for example, the pulse width may be set to be greater than normal. The maximum contrast may be increased by setting the grid potential Vg to be higher than normal.

Embodiment 2

Embodiment 1 relates to an example of temporarily increasing the maximum density by changing the maximum contrast or the laser pulse level as an image forming condition. Embodiment 2 relates to an example of temporarily adjusting the maximum density using the LUTa, which is an image forming condition. Here, the CPU 301 determines the contrast potential so that the maximum density is higher than the final target value (normal target value) by 0.1, and sets the grid potential and the developing bias potential to achieve this contrast potential.

Figure 14:
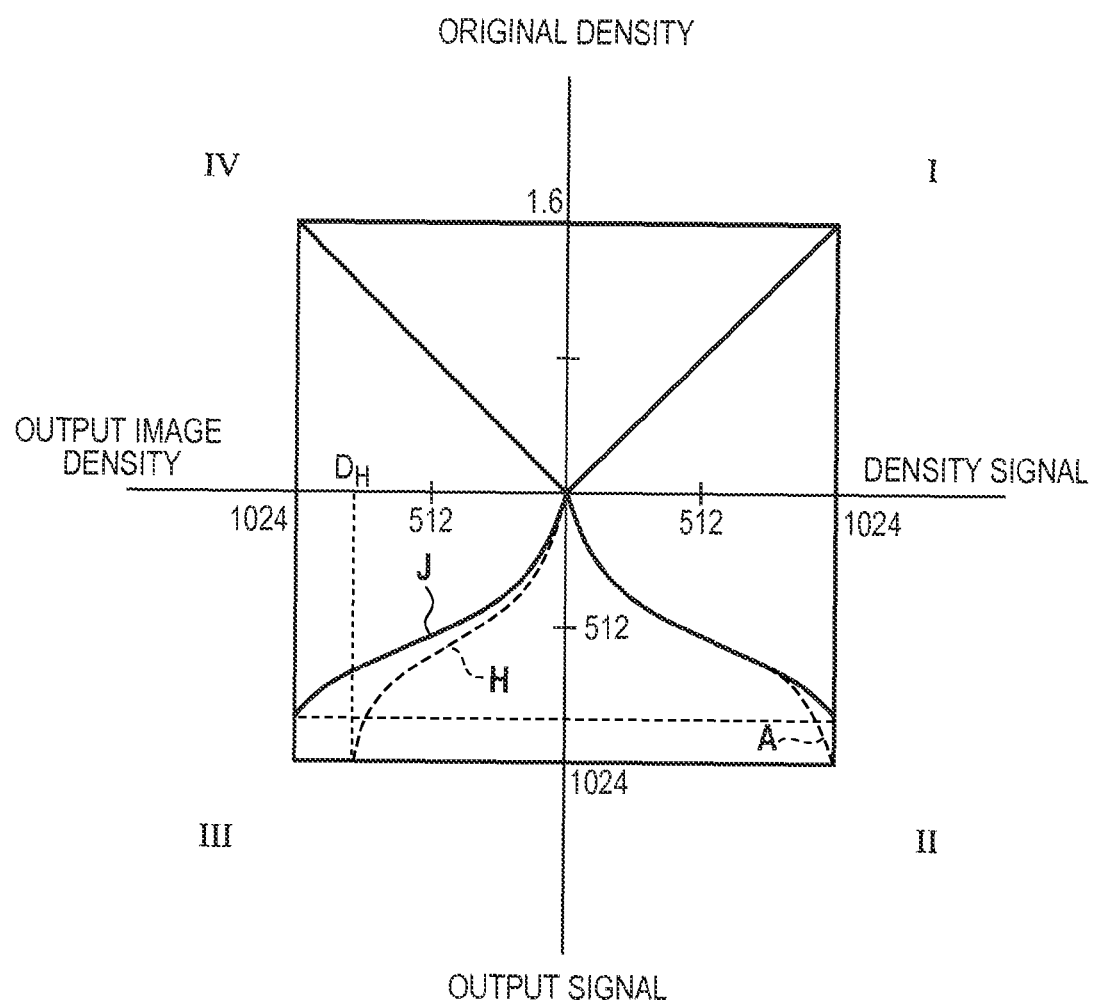
FIG. 14 is a characteristic conversion chart for describing a method of creating an LUTa.

The features of this embodiment are described below, with reference to a characteristic conversion chart shown in FIG. 14. The solid line J indicates the characteristics of the printer unit B in Quadrant III when the maximum density control of setting the maximum density to be higher than the final target value is performed. If the normal target value is used without such maximum density control, various error factors might lead to printer characteristics, in which maximum density DH does not reach the target density of 1.6. The dotted line H indicates such printer characteristics. In the case of the printer characteristics indicated by the dotted line H, the density in the range of DH to 1.6 is not reproducible, regardless of how the LUTa is set. This is because the LUTa has no capability of increasing the maximum density.

On the other hand, setting the image forming condition so that the maximum density is slightly exceeded, as indicated by the solid line J, ensures favorable overall density reproducibility in Quadrant IV. The LUTa created in this case does not produce the maximum output, even when the input to the LUTa is at the maximum. This can be solved by changing the LUTa to such a table that converts the maximum input to the maximum output, as indicated by the dotted line A in FIG. 14. The maximum density can be increased in this way.

Upon the process of adding any recording medium in this embodiment, the CPU 301 sets the LUTa modified to convert the maximum input to the maximum output in the gradation control unit 311, thus making the maximum density for the additional registration process higher than the normal maximum density. This contributes to improved accuracy of the LUTid in the high density region.

[Other Modifications]

Embodiments 1 and 2 may be combined. For example, suppose the maximum density for the additional registration process is to be set to be higher than the normal maximum density by 0.1. In such a case, the maximum density for the additional registration process may be set to be higher than the normal maximum density by 0.05 according to Embodiment 1, and set to be higher than the normal maximum density by 0.05 according to Embodiment 2. Thus, the method of increasing the maximum density by adjusting the contrast potential and the method of increasing the maximum density by modifying the LUTa may be used in combination. The ratio of the increases need not be 1:1, and may be changed to an appropriate ratio.

CONCLUSION

Figure 15:
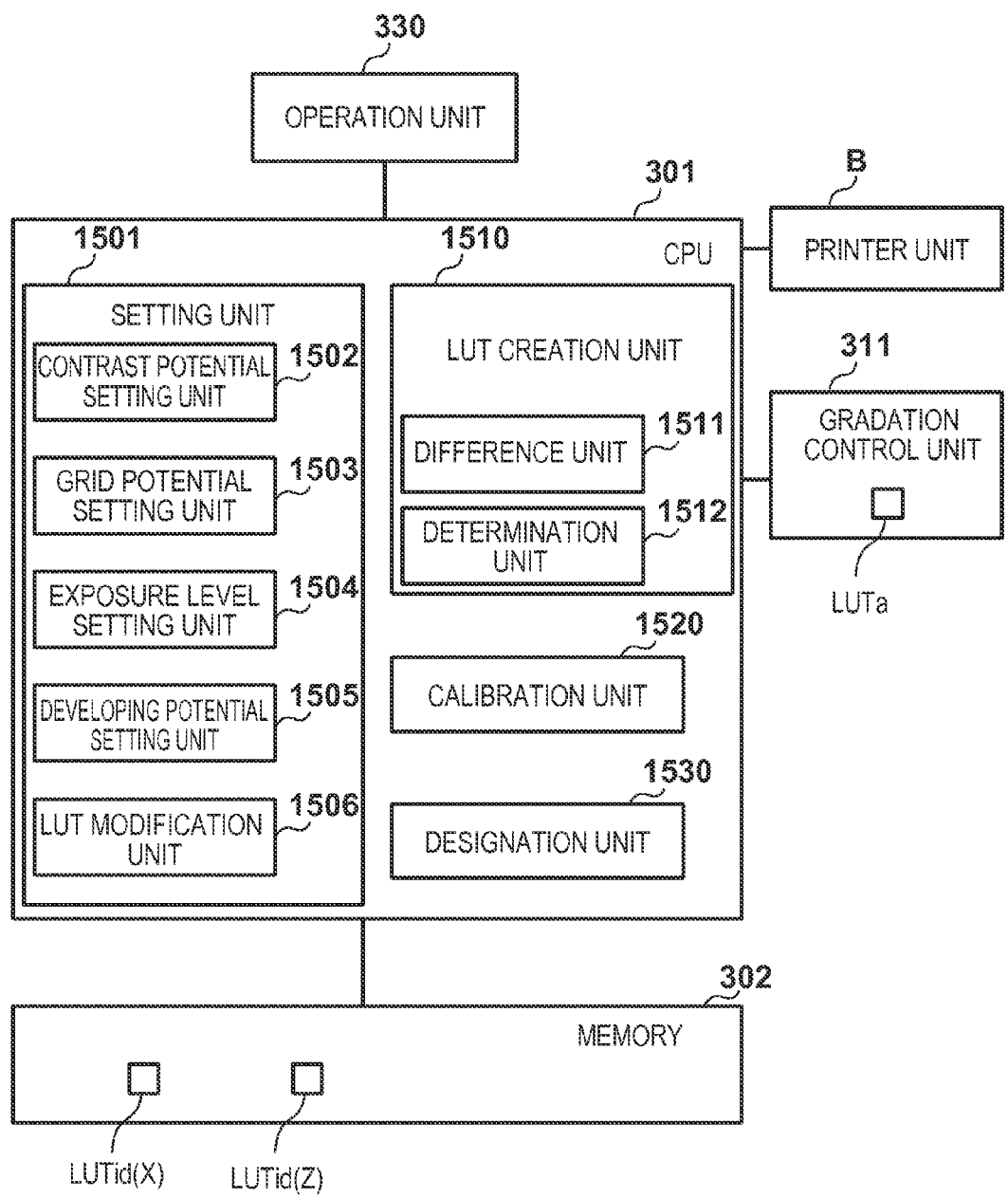
FIG. 15 is a block diagram showing functions relating to calibration.

The following describes the functions relating to the embodiments, with reference to FIG. 15. Though the functions can be mostly realized by the CPU 301 as described above, the functions may be partly or wholly realized by an integrated circuit, such as an ASIC or a logic circuit.

The CPU 301 in the image forming apparatus 100 starts a process of adding, as a recording medium usable for calibration, a recording medium Z different from a recording medium X, designated beforehand as a recording medium usable for calibration. A setting unit 1501 sets an image forming condition that makes the maximum density higher than that in normal image formation, for each of a first recording medium and a second recording medium, in the printer unit B or the gradation control unit 311. The normal image formation is a process for achieving the originally intended use of the image forming apparatus 100, such as copying or document printing, as mentioned earlier. In other words, the normal image formation is the formation of an image intended by a user on a recording medium. Meanwhile, image formation in calibration is a minor or a secondary image forming process. The printer unit B forms the same image pattern on each of the recording media X and Z, according to the image forming condition set by the setting unit 1501.

An LUT creation unit 1510 creates an LUTid(Z), which is second conversion setting information for converting luminance information to density information for the recording medium Z. To do so, the LUT creation unit 1510 may use I(X), which is luminance information obtained from the image pattern formed on the recording medium X, I(Z), which is luminance information obtained from the image pattern formed on the recording medium Z, and an LUTid (X), which is first conversion setting information for converting luminance information to density information for the recording medium X. The LUT creation unit 1510 is an example of a second generation unit that causes the image forming unit to form a first image pattern on the specific recording medium and to form a second image pattern on another recording medium, different from the specific recording medium, and generates a second conversion condition corresponding to the other recording medium, using first read data obtained by the obtaining unit, second read data obtained by the obtaining unit, and the first conversion condition stored in the storage unit. The LUT creation unit 1510 also functions as an addition unit that adds, as a recording medium usable for calibration, the recording medium Z, different from the recording medium X, designated beforehand as a recording medium usable for calibration.

A calibration unit 1520 performs calibration using the recording medium Z and the LUTid(Z). Such a structure improves the calibration accuracy in the high density region even when, for example, error factors are accumulated. By temporarily increasing the maximum density to form the image pattern, it is possible to obtain, as actually measured values, the maximum density used in normal image formation. The LUTid(Z) created based on this has higher accuracy, contributing to improved accuracy of calibration using the LUTid(Z).

Several methods are available to make the maximum density in the image pattern formed on each of the recording media X and Z higher than the maximum density of the image formed on the recording medium in normal image formation. For example, a method by which a contrast potential setting unit 1502 sets the contrast potential Vcont used when forming the image pattern to be higher than the contrast potential used in normal image formation is available. A method, by which a grid potential setting unit 1503 sets the grid potential Vg used when forming the image pattern to be higher than the grid potential used in normal image formation, is also available. A method by which an exposure level setting unit 1504 sets the exposure level used, when forming the image pattern to be higher than the exposure level used in normal image formation, is also available. This method can be realized by setting the exposure pulse width of the printer unit B used when forming the image pattern to be greater than the exposure pulse width used in normal image formation. A developing potential setting unit 1505 may set the developing potential (such as the developing bias Vdc) so that the maximum density in the image pattern formed on each of the recording media X and Z is higher than the maximum density of the image formed on the recording medium in normal image formation. An LUT modification unit 1506 may modify the correction unit (e.g., the LUTa in the gradation control unit 311) that corrects the gradation characteristics so that the maximum density in the image pattern formed on each of the recording media X and Z is higher than the maximum density of the image formed on the recording medium in normal image formation, as described in Embodiment 2. The LUTa is a table for converting an input value to an output value, as mentioned earlier. The LUT modification unit 1506 in the setting unit 1501 may modify the table so that the maximum input is converted to the maximum output.

These methods of temporarily increasing the maximum density may be used in combination. These methods may be used singly, or some or all of the methods may be used in combination.

A difference unit 1511 in the LUT creation unit 1510 may calculate the difference between I(X) and I(Z), and a determination unit 1512 in the LUT creation unit 1510 may add the difference to the LUTid(X) to determine the LUTid(Z). Other LUTid(Z) determination methods are also applicable.

A designation unit 1530 designates a recording medium used for calibration, according to user input through the operation unit 330. For example, the operation unit 330 may display information of recording media for each of which the LUTid is stored in the memory 302, and prompt the user to select one of the recording media. When the recording medium X is designated by the designation unit 1530, the color processing unit 303 converts the luminance information obtained from the image pattern formed on the recording medium X to density information, using the LUTid(X). When the recording medium Z is designated by the designation unit 1530, the color processing unit 303 converts the luminance information obtained from the image pattern formed on the recording medium Z to density information, using the LUTid(Z). The calibration unit 1520 performs calibration using the density information output from the color processing unit 303. Since the LUTid(Z) creation accuracy, especially in the high density region, is higher than conventional, as mentioned above, calibration can be performed with higher accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
a correction unit configured to correct image data using a correction condition;
an image forming unit configured to form (i) an image, having a density, and (ii) a measurement image on a recording medium, based on the image data corrected by the correction unit;
an obtaining unit configured to obtain read data obtained by a reading unit configured to read the measurement image formed on the recording medium by the image forming unit;
a determination unit configured to determine a contrast potential used in a case when the image forming unit forms the image based on the image data, based on the read data obtained by the obtaining unit;
a conversion unit configured to convert the read data to density data, using a conversion condition corresponding to the recording medium;
a first generation unit configured to generate the correction condition, based on the density data obtained by the conversion unit converting the read data;
a storage unit configured to store a first conversion condition corresponding to a specific recording medium;
a second generation unit configured (i) to control the image forming unit to form a first image pattern on the specific recording medium and to form a second image pattern on another recording medium, different from the specific recording medium, and (ii) to generate a second conversion condition corresponding to the other recording medium using first read data, second read data, and the first conversion condition stored in the storage unit, the first read data being obtained by the reading unit reading the first image pattern on the specific recording medium, and the second read data being obtained by the reading unit reading the second image pattern on the other recording medium, wherein the first image pattern and the second image pattern each have a density; and
a control unit configured to control the contrast potential used in a case when the image forming unit forms the first image pattern and the second image pattern, so that (i) the maximum density of the first image pattern and the second image pattern formed by the image forming unit is higher than (ii) the maximum density of the image formed by the image forming unit,
wherein (i) the first conversion condition is used for converting read data of the measurement image on the specific recording medium into density data on the specific recording medium, and (ii) the second conversion condition is used for converting read data of the measurement image on the other recording medium into density data on the specific recording medium.

2. The image forming apparatus according to claim 1, wherein the control unit is configured to control a charging potential of the image forming unit used for forming the first image pattern and the second image pattern, so that (i) the density of the first image pattern and the second image pattern formed by the image forming unit is higher than (ii) the density of the image formed by the image forming unit.

3. The image forming apparatus according to claim 1, wherein the control unit is configured to control an exposure intensity of the image forming unit used for forming the first image pattern and the second image pattern, so that (i) the density of the first image pattern and the second image pattern formed by the image forming unit is higher than (ii) the density of the image formed by the image forming unit.

4. The image forming apparatus according to claim 1, wherein the control unit is configured to control a developing potential of the image forming unit used for forming the first image pattern and the second image pattern, so that (i) the density of the first image pattern and the second image pattern formed by the image forming unit is higher than (ii) the density of the image formed by the image forming unit.

5. The image forming apparatus according to claim 1, wherein the correction condition is a table for correcting gradation characteristics of the image formed by the image forming unit.

6. The image forming apparatus according to claim 1, wherein the second generation unit is configured to generate the second conversion condition, based on (i) the first conversion condition and (ii) a difference between the first read data and the second read data.

7. The image forming apparatus according to claim 1, having a printer mode of forming, on the recording medium, an image based on image data by a receiving unit receiving the image data,
wherein the control unit is configured to control the contrast potential used for forming the first image pattern and the second image pattern, so that (i) the density of the first image pattern and the second image pattern formed by the image forming unit is higher than (ii) the density of the image to be formed on the recording medium by the image forming unit, in a case when an instruction is given to execute the printer mode.

8. The image forming apparatus according to claim 1, having a copy mode of forming, on the recording medium, an image based on read data obtained by the reading unit reading an original,
wherein the control unit is configured to control the contrast potential used for forming the first image pattern and the second image pattern, so that (i) the density of the first image pattern and the second image pattern formed by the image forming unit is higher than (ii) the density of the image formed on the recording medium by the image forming unit, in a case when an instruction is given to execute the copy mode.

* * * * *